United States Patent
Ruglio et al.

(10) Patent No.: US 7,824,730 B2
(45) Date of Patent: Nov. 2, 2010

(54) METHOD AND APPARATUS FOR MEASURING COATING THICKNESS WITH A LASER

(75) Inventors: Anthony G. Ruglio, Rocky Hill, CT (US); Keith E. Lockyer, Somers, CT (US); John E. Markowski, Berlin, CT (US); Dipakkumar S. Patel, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 360 days.

(21) Appl. No.: 11/848,785

(22) Filed: Aug. 31, 2007

(65) Prior Publication Data
US 2009/0061075 A1    Mar. 5, 2009

(51) Int. Cl.
G01B 11/02 (2006.01)
G01B 11/06 (2006.01)
G01B 11/08 (2006.01)

(52) U.S. Cl. .............. 427/9; 427/8; 427/240; 427/402; 702/170; 702/172

(58) Field of Classification Search ............ 427/98.4, 427/8, 240, 9; 702/170, 172
See application file for complete search history.

(56) References Cited

U.S. PATENT DOCUMENTS

| | | | |
|---|---|---|---|
| 4,049,352 A | 9/1977 | Lardon et al. | |
| 4,280,188 A * | 7/1981 | Weinstein et al. | 702/141 |
| 4,501,095 A | 2/1985 | Drinkuth et al. | |
| 4,611,919 A | 9/1986 | Brooks, Jr. et al. | |
| 4,748,331 A * | 5/1988 | Nagao et al. | 250/559.27 |
| 5,221,636 A | 6/1993 | Landreau et al. | |
| 5,257,090 A | 10/1993 | Meinzer et al. | |
| 5,267,016 A | 11/1993 | Meinzer et al. | |
| 5,281,798 A | 1/1994 | Hamm et al. | |
| 5,394,488 A | 2/1995 | Fernald et al. | |
| 5,754,294 A * | 5/1998 | Jones et al. | 356/503 |
| 6,052,191 A * | 4/2000 | Brayden et al. | 356/630 |
| 6,055,058 A | 4/2000 | Krahbichler et al. | |
| 6,998,147 B2 * | 2/2006 | Nesbitt | 427/8 |
| 7,040,546 B2 | 5/2006 | Horan et al. | |
| 7,145,653 B1 | 12/2006 | Templeton et al. | |
| 2004/0229546 A1 * | 11/2004 | Hansen | 451/6 |

(Continued)

FOREIGN PATENT DOCUMENTS

EP    0738561 A1    10/1996

(Continued)

OTHER PUBLICATIONS

Duratrax, FlashPointTM Infrared Temperature Gauge, (2006).*

(Continued)

*Primary Examiner*—Michael Cleveland
*Assistant Examiner*—Lisha Jiang
(74) *Attorney, Agent, or Firm*—Carlson, Gaskey & Olds

(57) ABSTRACT

A method of measuring a coating deposits a layer of coating on an object. A laser beam is projected on the layer of the coating. A reflection of the project laser beam is received by the laser sensor. From this information, the thickness of the layer of the coating on the object is determined. A value related to the thickness of the layer of the coating may then be compared to a desired value.

20 Claims, 4 Drawing Sheets

U.S. PATENT DOCUMENTS

2005/0137829 A1 * 6/2005 Gimelfarb et al. ........... 702/171

FOREIGN PATENT DOCUMENTS

GB          2421738 A     7/2006

OTHER PUBLICATIONS

"Infrared Laser Interferometric Measurement of Substrate Temperature and Film Growth Rates" IBM Technical Disclosure Bulletin, IBM Corp., New York, US, vol. 33, No. 2, Jul. 1, 1990, pp. 395-397, XP000123661, ISSN: 0018-8689.

European Search Report for Application No. EP 08 25 2830 dated Dec. 19, 2008.

* cited by examiner

METHOD AND APPARATUS FOR MEASURING COATING THICKNESS WITH A LASER

BACKGROUND OF THE INVENTION

This invention generally relates to a method and apparatus for measuring a thickness of a coating on a part by using a laser.

In the manufacture, repair or replacement of a part, the part may require the application of a coating. For high precision components, such as aircraft parts, the thickness of the coating may affect whether a part is in conformance with specification. Accordingly, the part is typically measured following complete application of the coating to make this determination.

In the past, gauges, such as micrometers, were used to measure the overall dimension of the coated part. This technique may not be accurate due to gauge error, user error or variation in the technique of using the measuring instrument. Furthermore, because the part is often measured after a coating application, the part may have too much or too little coating applied.

In addition, thermal spraying of a coating, such as by plasma or HVOF spray, may significantly heat the part. Due to thermal expansion, the part may not be accurately measured. For example, the part may be measured at a high temperature when it is expanded compared to measuring the part at room temperature when it is smaller.

A need exists for a more accurate technique and apparatus for measuring a coating on an object, such as a part.

SUMMARY OF THE INVENTION

The invention is a technique and apparatus for measuring a coating thickness. An object is measured in size. Coating is applied to the object. A laser beam is projected on the coating. The laser beam is reflected by the coating to a laser sensor. From the reflected laser, a computer determines the thickness of the coating. The coating thickness and the object dimension are then compared to a desired target dimension.

The various features and advantages of this invention will become apparent to those skilled in the art from the following detailed description. The drawings that accompany the detailed description can be briefly described as follows.

DETAILED DESCRIPTION OF THE INVENTION

Figure 1:
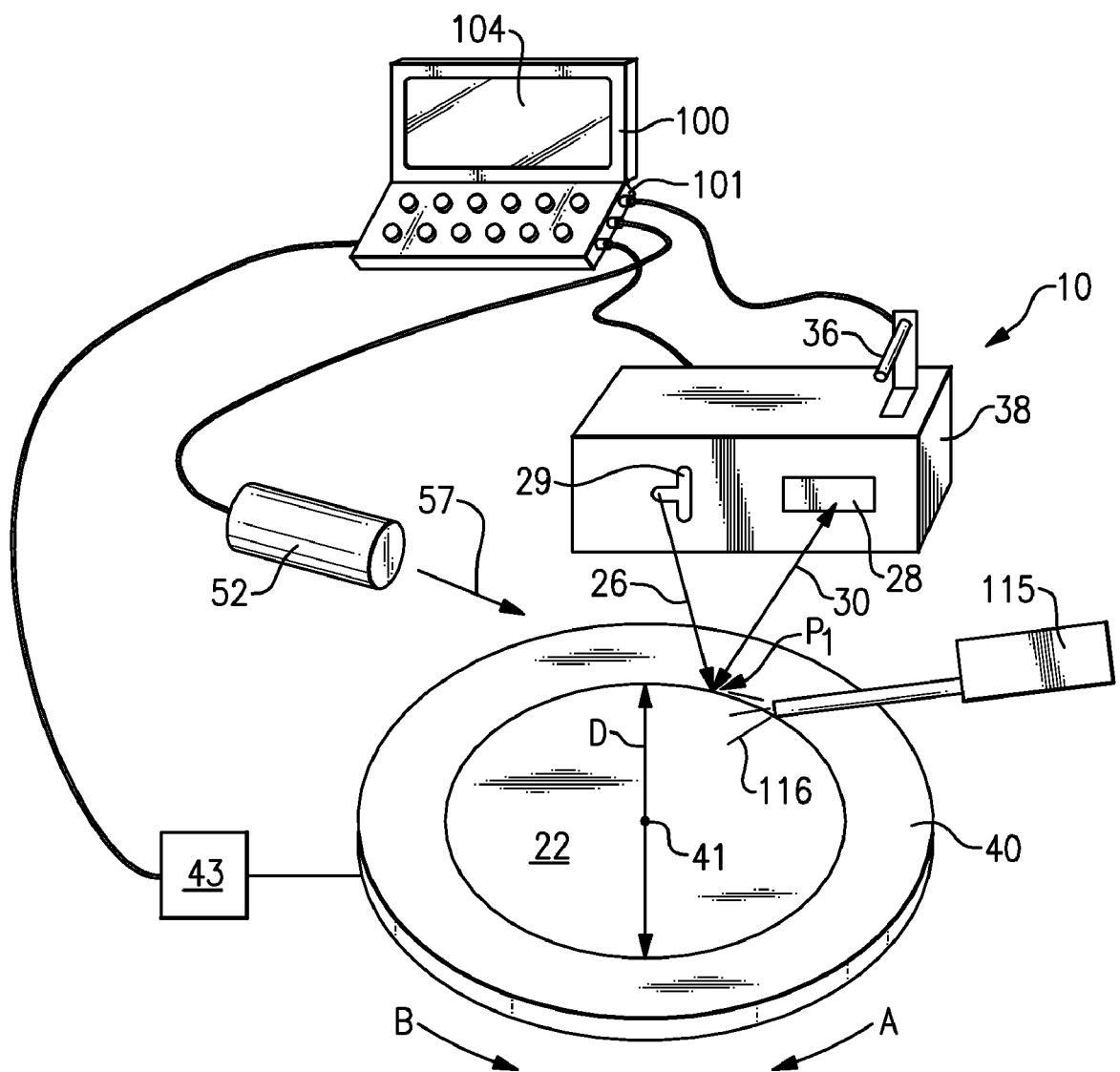
FIG. 1 illustrates a view of the inventive apparatus, including laser gauge, temperature gauges and computer.

FIG. 1 illustrates a view of an inventive laser gauge assembly 10. Laser gauge assembly 10 has laser gauge 38, having laser source 29 and laser sensor 28. Laser source 29 projects laser beam 26, while laser sensor 28 senses laser beam 30, which is reflected from a surface of object 22, here an aircraft part. Laser gauge 38 is known in the art and provides data to computer 100. This data may be displayed on display 104 of computer 100.

In addition, computer 100 is linked to ambient temperature gauge 36, here a thermocouple, as well as temperature gauge 52, here an infrared temperature gauge. As shown, temperature gauge 52 is aligned to project infrared beam 57 so as to determine the temperature of object 22 near position $P_1$, the point where laser beam 26 is a projected and laser beam 30 reflected. Ambient temperature gauge 36 measures the temperature of the surrounding air. Data from ambient temperature gauge 36 and temperature gauge 52 are supplied to computer 100. Computer 100 has programming 101 that tracks and determines changes in the size of object 22, as well as its temperature. These changes may be tracked over time.

Many high precision aircraft components are round. Accordingly, turntable 40 is provided. Turntable 40 has center 41. Furthermore, turntable 40 is rotatable by a mechanical actuator (not shown) so that turntable 40 may rotate in the direction of arrow A or in the direction of arrow B as the operator may choose. In addition, turntable 40 has rotational position sensor 43, a RIM device encoder, that tracks the rotational position of turntable 40, such as by a polar coordinate system, and provides this data to computer 100. In this way, laser computer 100 may record position $P_1$ as turntable 40 rotates, relating and storing $P_1$ for each incremental rotation of turntable 40.

Also shown in FIG. 1 is thermal sprayer 115 (shown schematically), such as a plasma or HVOF sprayer. As can be seen, laser gauge assembly 10 is positioned so as to measure $P_1$ as thermal sprayer 115 applies spray 116 to object 22.

Figure 2:
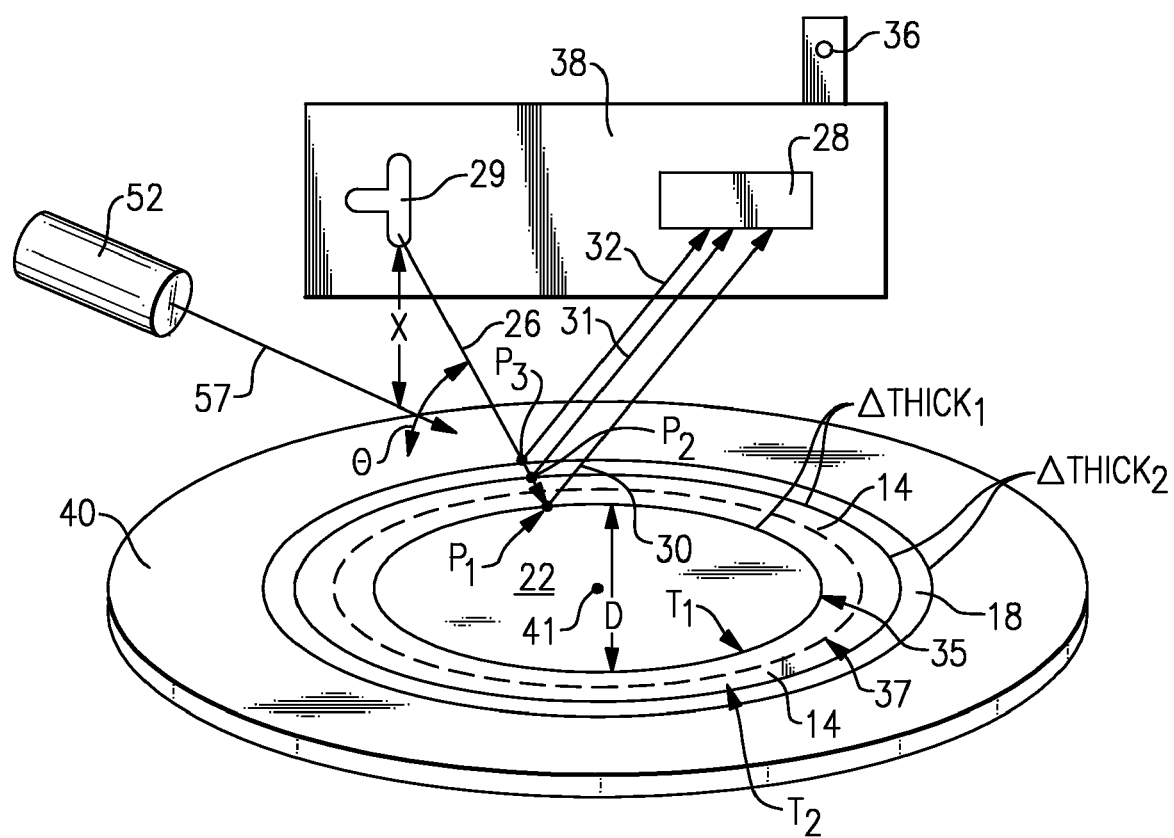
FIG. 2 illustrates the use of the inventive apparatus of FIG. 1 to measure a coating thickness of an object.

FIG. 2 and illustrate how laser gauge assembly 10 determines changes in thickness of coating applied by thermal sprayer 115 to object 22. As indicated by Step A, dimension D of object 22 before coating, such as a diameter, is determined prior to placing object 22 on turntable 40. Laser gauge 38 is positioned at height X above turntable 40 and projects laser beam 26 downward at object 22 at angle θ relative to turntable 40. In conjunction with the rotational position of turntable 40, height X, angle θ and position $P_1$ create a three dimensional polar coordinate system. Laser beam 26 reflects off object 22 at position $P_1$ and its reflection, laser beam 30, is picked up by laser sensor 28. From this data, position $P_1$ is geometrically determined by computer 100. Turntable 40 is rotated with object 22. As turntable 40 is rotated, position $P_1$ is displayed on display 104. An operator may then refer to display 104 to center object 22 relative to table 40 on center 41 of turntable 40. To do so, the operator moves object 22 on turntable 40 and rotates turntable 40 in the direction of arrow A or B until $P_1$ is generally the same as object 22 rotates completely around.

Following the centering of object 22 on turntable 40, first coating layer 14 is applied to object 22 by thermal sprayer 115 (Step B). As coating is applied, laser gauge 38 tracks position $P_2$, which is the position where laser beam 26 reflects laser beam 31 from the surface of first coating layer 14, as object 22 is rotated 360° by turntable 40. In this way, laser gauge assembly 10 can determine a value related to the thickness of first coating layer 14 as coating is applied (Step C). For example, the thickness of first coating layer 14, $\Delta Thick_1$, may be determined by subtracting $P_1$ from $P_2$ for a particular rotational position of object 22. In addition, by adding the size of object dimension D, to $\Delta Thick_1$, an overall size of object 22 with coating is determined at each rotational position of turntable 40.

In addition, as indicated by Step D, the part temperature in the vicinity of position $P_1$ is measured by temperature gauge 52, here an infrared temperature gauge, and recorded by computer 100. Ambient temperature gauge 36 also tracks temperature near object 22. Data from ambient temperature gauge 36 and temperature gauge 52 is recorded by computer 100 over time for each incremental rotational position of turntable 40. By monitoring temperature through ambient temperature gauge 36 and temperature gauge 52, as will be explained, part size expansion due to heating of object 22 by thermal sprayer 115 can be factored out of the measurement of object 22, providing a more accurate technique for measuring object 22.

Second coating layer 18 may also be applied by thermal sprayer 115. Thickness of second coating layer 18 is determined by subtracting $P_2$ from position $P_3$, the position where laser beam 26 reflects laser beam 32 from the surface of coating 18 to arrive at thickness of second coating layer, $\Delta$ Thick$_2$, of second coating layer 18. Again, temperature data from ambient temperature gauge 36 and temperature gauge 52 are recorded over time for second coating layer 18 at each rotational position of turntable 40. Such data may be recorded for numerous positions of coating layers beyond first coating layer 14 and second coating layer 18.

Following a number of applications of coatings by thermal sprayer 115, computer 100 has recorded the change in thickness of the coating on object 22, e.g., $\Delta$ Thick$_1$, $\Delta$ Thick$_2$, etc. This data is collected and related to the rotational position of turntable 40 and over time. In addition, for each rotational position and over time, temperature data from temperature gauge 52 and ambient temperature gauge 36 is recorded.

With reference to FIG. 2, thermal expansion of object 22 may be accounted for and eliminated from the measurement of object 22. To determine an expansion compensation value, object 22 is rotated as thermal sprayer 115 is operated without coating. As thermal sprayer 115 heats object 22, a position, such as position $P_1$, is tracked over temperature changes with rotational position (refer to Step E of FIG. 3). For example, object 22 may have first size 35 at temperature $T_1$ and second size 37 at temperature $T_2$. Thermal sprayer 115 is then turned off, and object 22 allowed to cool as turntable 40 continues to turn. $P_1$ is tracked with temperature cooling as well. This tracking of changes in temperature can occur for a number of cycles to ensure accuracy. Computer 100 then has an expansion value, $P_1$ at temperature $T_2$ subtracted from $P_1$ at temperature $T_1$, for changes in size of object 22, dimension D, which may be subtracted as an offset when coating is applied for purposes of reaching the final desired thickness of object 22 with coating, $V_D$ (see Step F of FIG. 3).

For purposes of measuring temperature of object 22, ambient temperature gauge 36 will be initially more accurate than temperature gauge 52, an infrared temperature gauge. Accordingly, computer is programmed to rely upon readings from ambient temperature gauge 36 until temperature gauge 52 begins to read the same temperature as ambient temperature gauge 36, at which point temperature gauge 52 will be more accurate. Conversely, as object 22 cools, computer 100 will initially rely on temperature gauge 52 and then switch to ambient temperature gauge 36 when the two readings from temperature gauge 52 and ambient temperature gauge 36 crossover.

Figure 3:
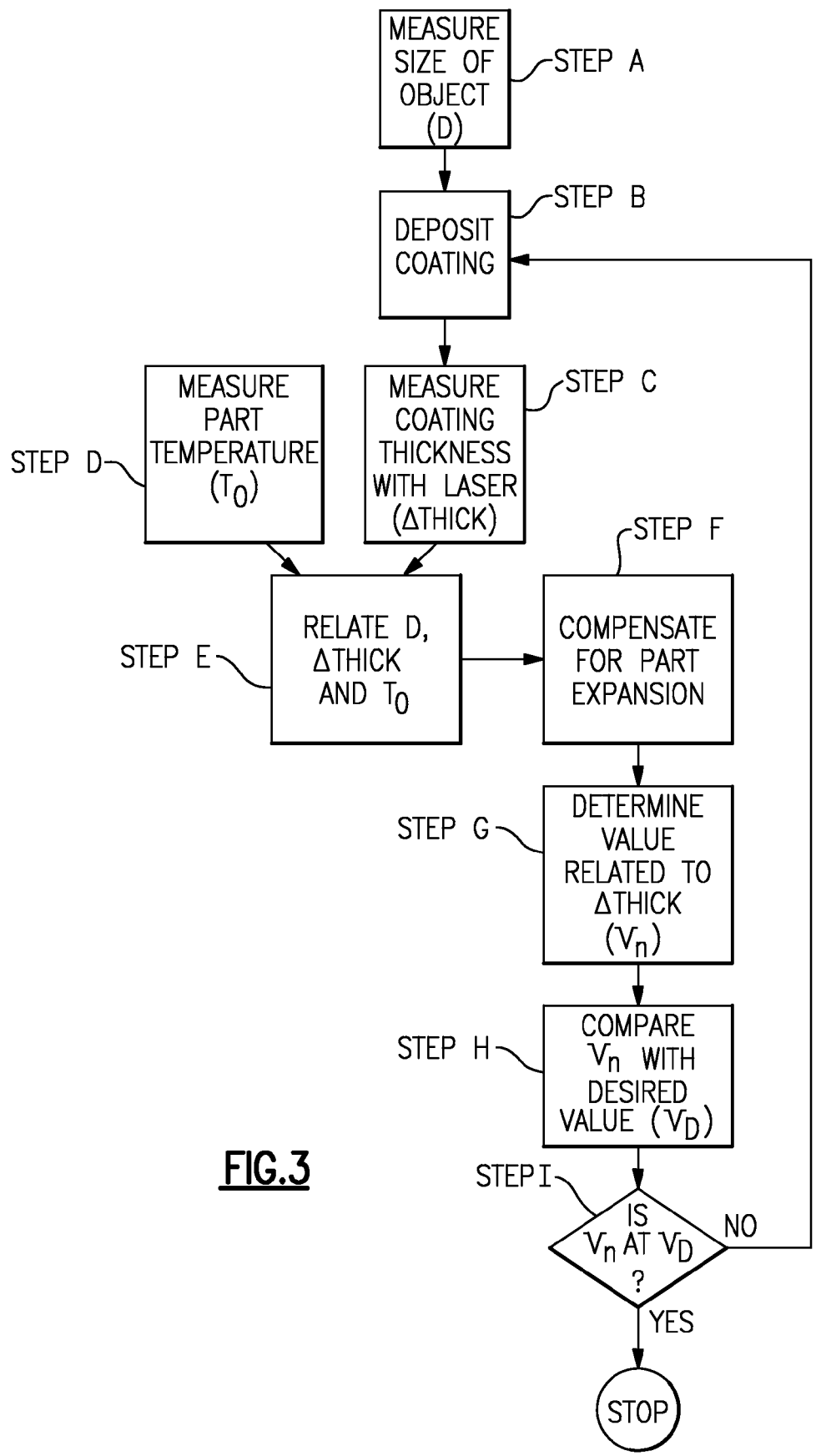
FIG. 3 illustrates a flowchart of the inventive technique for measuring a coating thickness using the apparatus of FIGS. 1-2.

With reference to FIG. 3, Step G, following the creation of an expansion compensation value, the size of object 22 with coatings is determined. This value of size of object 22 with coatings, $V_n$, for a particular rotational position is simply the dimension D of object 22 and the sum of all changes in coating thickness $\Sigma \Delta$ Thick$_n$. As noted in Step H, this value, $V_n$, related to $\Delta$ Thick is then compared to a desired value $V_d$, which may be a single value or a range of target values for the overall size of object 22. With reference to Step I, if the overall dimension of object 22 is at the desired value, $V_d$, then the coating process and the measuring process may be stopped. If $V_n$ is not at or within the desired value, target steps B-I with reference to FIG. 3 may be repeated until $V_n$ is at or within $V_d$.

Figure 4:
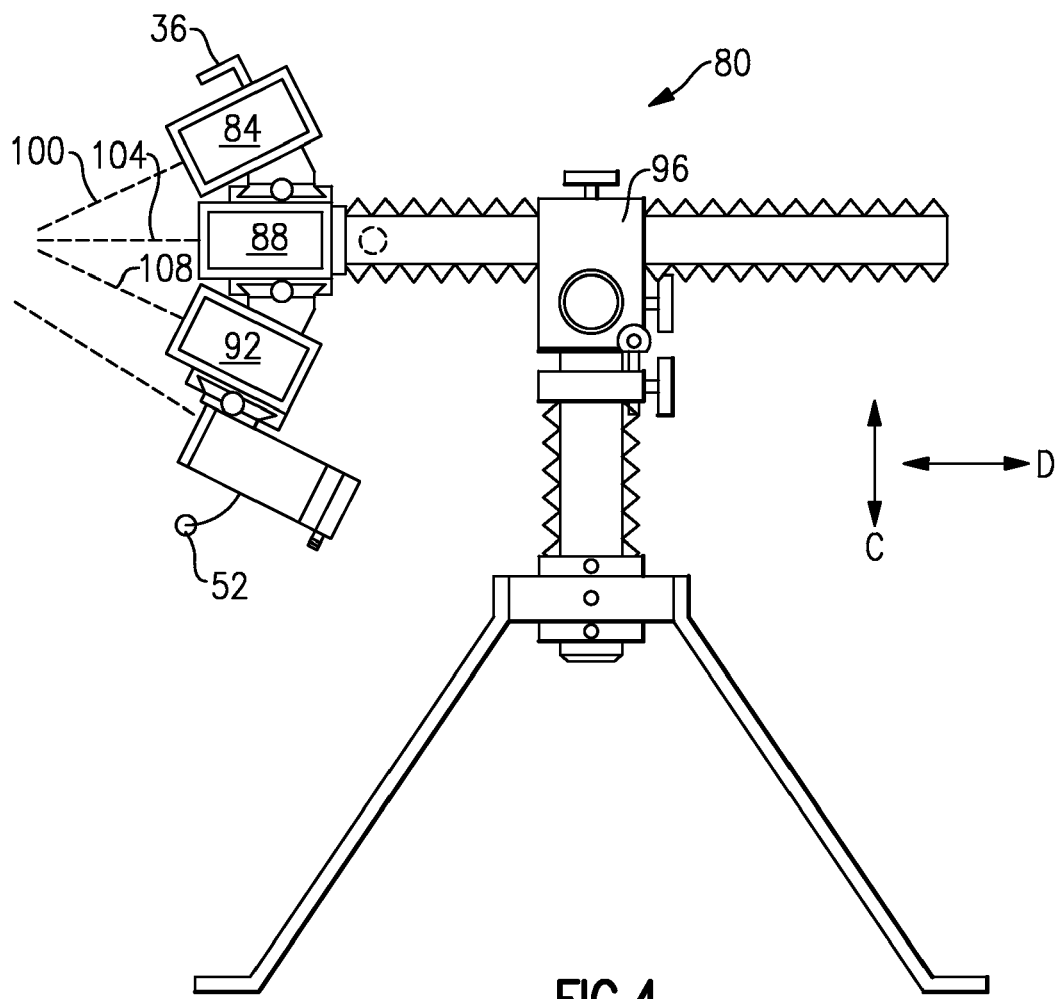
FIG. 4 illustrates another configuration of the invention having multiple laser gauges.

With reference to FIG. 4, there is shown laser gauge assembly 80. Here, laser gauge assembly 80 has three laser gauges, first laser gauge 84, second laser gauge 88 and third laser gauge 92, all generally constructed in the same manner as laser gauge assembly 10. In addition, temperature gauge 52 and ambient temperature gauge 36 are also provided. All are mounted on stand 96, which allows movement of laser gauges and temperature gauge 52 along axis C or along axis D. Stand 96 may also be rotated about axis C as well. In addition, as shown, laser gauge 84 projects laser 100 on object 22 while second laser gauge 88 projects laser 104 on object 22 while third laser gauge 92 projects laser 108 on object 22. As is evident from FIG. 4, the lasers 100, 104, 108 may converge at a location on or inside an object being measured. Laser gauge assembly 80 may be used to measure changes in size of sharp edge objects as described below.

Figure 5:
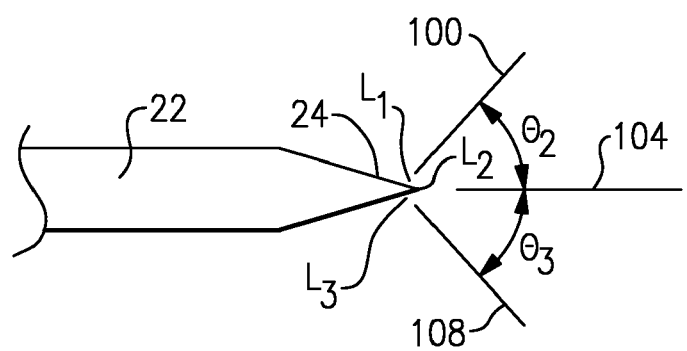
FIG. 5 illustrates a technique for measuring a coating of an object's edge.

With reference to FIG. 5, a close-up of object 22 is shown in FIG. 5, revealing a sharp edge 24 to object 22. As shown, lasers 100, 104 and 108 are projected at different angles on to knife edge 24 such that laser 100 shines on locality $L_1$ while laser 104 shines on locality $L_2$ and laser 108 shines on locality $L_3$. Laser 100 is projected at angle $\theta_2$ while laser 108 is projected at angle $\theta_3$ relative to laser 104. $L_1$, $L_2$ and $L_3$ are located very closely together, however, they are not at the same location. In this way, when object 22 is rotated on turntable 40, sharp edge 24 will be able to reflect laser back from one of these lasers to the respective sensor of laser gauge 84, 88 and 92. This feature aids in allowing laser gauge 80 to continue to monitor changes in coating thickness at sharp edge 24 even when sharp edge 24 may move during rotation out of the line of one or two laser beams.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of measuring a coating, comprising the steps of:

measuring a size of an object;

depositing a layer of a coating on the object;

projecting a plurality of laser beams on the layer of the coating the object rotates on a turntable, wherein the plurality of laser beams includes a first laser beam projected along a first axis and a second laser beam projected along a second axis, wherein the first laser beam and second laser beam are oriented such that the first axis and second axis converge at a location on or inside the object;

determining a thickness of the layer of the coating on the object from a reflection of the plurality of projected laser beams; and comparing a value related to the thickness of the layer of the coating to a desired value.

2. The method of claim 1 including the step of:

relating the size of the object to the thickness of the layer of the coating to determine the value related to the thickness of the layer of the coating.

3. The method of claim 2 wherein relating comprises summing the size of the object with the thickness of the layer of the coating.

4. The method of claim 1 including the step of:
measuring a temperature of the object.

5. The method of claim 4 wherein an ambient temperature is measured to determine the temperature of the object.

6. The method of claim 4 wherein measuring comprises projecting a light source on the object to determine the temperature of the object.

7. The method of claim 4 including the steps of:
measuring a first size of the object at a first temperature;
measuring a second size of the object at a second temperature different than the first temperature; and
comparing the first size of the object at the first temperature to the second size of the object at the second temperature.

8. The method of claim 7 including the step of:
determining an expansion compensation value in response to said comparing the first size of the object at the first temperature to the second size of the object at the second temperature, wherein the expansion compensation value is used to compare the value related to the thickness of the layer of the coating to the desired value.

9. The method of claim 1 wherein said steps of depositing a layer of a coating, projecting a plurality of laser beams on the layer of the coating, receiving a reflection of the projected laser beam, and determining a thickness of the layer of the coating until the value related to the thickness of the layer is equal to the desired value are repeated for another layer of coating on the object to determine a thickness of the another layer.

10. The method of claim 9 wherein the value related to the thickness of the layer of the coating comprises the thickness of the layer of the coating and the thickness of the another layer of the coating.

11. The method of claim 1 wherein the desired value comprises a range of values.

12. The method of claim 1, wherein said determining a thickness of the layer of the coating on the object from the reflection of the plurality of projected laser beams is selectively repeated at a plurality of locations on the object as the object rotates on the turntable.

13. The method of claim 1, including:
centering the object on the turntable.

14. The method of claim 1, including:
selectively repeating said steps of depositing a layer of a coating, projecting a plurality of laser beams on the layer of the coating, receiving a reflection of the plurality of projected laser beams, and determining a thickness of the layer of the coating until the value related to the thickness of the layer is equal to the desired value.

15. The method of claim 1, wherein the plurality of laser beams also includes a third laser beam projected along a third axis, wherein the third laser beam is oriented such that the third axis converges with the first axis at a location on or inside the object and such that the third axis converges with the second axis at a location on or inside the object.

16. A method of measuring a coating, comprising the steps of:
measuring a size of an object;
depositing a layer of a coating on the object;
projecting a first laser beam and a second laser beam on the layer of the coating along axes that converge at a location on or inside the object;
determining a thickness of the layer of the coating on the object from a reflection of the first and second projected laser beams;
detecting a temperature using an infrared temperature sensor to obtain a first temperature value;
detecting a temperature using an ambient temperature sensor to obtain a second temperature value;
selectively defining the infrared temperature value as the object temperature in response to the infrared temperature value being greater than or equal to the ambient temperature value;
selectively defining the ambient temperature as the object temperature in response to the infrared temperature value being less than the ambient temperature value;
relating the size of the object to the temperature of the object and to the thickness of the layer of the coating to determine a value related to the thickness of the layer of the coating; and
comparing the value related to the thickness of the layer of the coating to a desired value.

17. The method of claim 16 wherein measuring the size of the object comprises the steps of:
measuring a first size of the object at a first object temperature; and
measuring a second size of the object at a second object temperature different than the first temperature.

18. The method of claim 17 including the step of:
comparing the first size of the object at the first object temperature to the second size of the object at the second object temperature to determine a comparison.

19. The method of claim 18 including the step of:
determining an expansion compensation value in response to said comparison, wherein the expansion compensation value is used to compare the value related to the thickness of the layer of the coating to the desired value.

20. The method of claim 16 including the step of:
projecting a third laser beam on the layer of the coating along a third axis, wherein the third laser beam is oriented such that the third axis converges with the first axis at a location on or inside the object, and such that the third axis converges with the second axis at a location on or inside the object.

* * * * *